United States Patent [19]
Klocek

[11] Patent Number: 5,952,661
[45] Date of Patent: Sep. 14, 1999

[54] CHOPPER FOR THERMAL IMAGING SYSTEM AND METHOD

[75] Inventor: Paul Klocek, Dallas, Tex.

[73] Assignee: Raytheon Company, Lexington, Mass.

[21] Appl. No.: 08/904,145

[22] Filed: Jul. 31, 1997

Related U.S. Application Data

[60] Provisional application No. 60/024,048, Aug. 16, 1996.
[51] Int. Cl.⁶ .................................................. G01J 5/06
[52] U.S. Cl. .......................... 250/351; 250/332; 250/350
[58] Field of Search ................................... 250/350, 351, 250/505.1, 332

[56] References Cited

U.S. PATENT DOCUMENTS

| | | |
|---|---|---|
| 3,352,156 | 11/1967 | Beitz . |
| 4,072,863 | 2/1978 | Roundy . |
| 4,965,447 | 10/1990 | Bly et al. ................................. 250/351 |
| 5,051,591 | 9/1991 | Trotta et al. ............................ 250/351 |
| 5,486,698 | 1/1996 | Hanson et al. .......................... 250/351 |

FOREIGN PATENT DOCUMENTS

| | | |
|---|---|---|
| 0410745A1 | 1/1991 | European Pat. Off. . |
| 2061463 | 6/1972 | Germany . |
| 2731654B1 | 8/1978 | Germany . |
| 55-143418 | 11/1980 | Japan . |
| 7-311353 | 11/1995 | Japan . |
| 1551519 | 8/1979 | United Kingdom . |
| 218706 | 8/1987 | United Kingdom . |

*Primary Examiner*—Constantine Hannaher
*Assistant Examiner*—Darren M. Jiron
*Attorney, Agent, or Firm*—Baker & Botts, L.L.P.

[57] ABSTRACT

Thermal imaging chopper (20) may comprise a disk (40) formed of a thermally transmitting material. The disk (40) may include a structure (44) operable to randomly scatter thermal radiation of the scene (14).

27 Claims, 2 Drawing Sheets

CHOPPER FOR THERMAL IMAGING SYSTEM AND METHOD

This application claims priority under 35 USC § 119(e)(1) of provisional application number 60/024,048 filed Aug. 16, 1996.

GOVERNMENT RIGHTS

This invention was made with government support under Contract No. DTRS-56-95-T-0001, awarded by the U.S. Government. The Government has certain rights in the invention.

TECHNICAL FIELD OF THE INVENTION

This invention relates generally to infrared or thermal imaging systems, and more particularly to a diffuse chopper for normalizing thermal sensors and method.

BACKGROUND OF THE INVENTION

Thermal imaging systems are often employed to detect fires, overheating machinery, planes, vehicles and people, and to control temperature sensitive industrial processes. Thermal imaging systems generally operate by detecting the differences in thermal radiance of various objects in a scene and by displaying the differences as a visual image of the scene.

The basic components of a thermal imaging system generally include optics for collecting and focusing thermal radiation from a scene, a thermal detector having a plurality of thermal sensors for converting thermal radiation to an electrical signal, and electronics for amplifying and processing the electrical signal into a visual display or for storage in an appropriate medium.

The thermal sensors of a thermal imaging system may be disposed in a focal plane array. The focal plane array and its associated thermal sensors are often coupled to an integrated circuit substrate with a corresponding array of contact pads and a thermal isolation structure disposed between the focal plane array and the integrated circuit substrate. The thermal sensors define the respective picture elements or pixels of the resulting thermal image.

One type of thermal sensor includes a thermal sensitive element formed from pyroelectric material which exhibits a state of electrical polarization and/or change in dielectric constant dependent upon temperature changes of the pyroelectric material in response to incident infrared radiation. A pair of thin film electrodes are generally disposed on opposite sides of the pyroelectric material to act as capacitive plates. In this arrangement, the pyroelectric material acts as a dielectric, or insulator, disposed between the capacitive plates. Accordingly, the electrodes are operable to measure the charge generated by the pyroelectric material in response to changes in temperature. As previously discussed, the charge, or electrical signal, may be amplified and processed into a visual display.

A chopper is often included in a thermal imaging system to A.C. couple the detector to the scene. The chopper produces a constant background radiance which provides a reference signal. The electronic processing portion of the thermal imaging system will subtract the reference signal from the total radiance signal to produce a signal with minimum background bias.

A problem with choppers, however, is that they are relatively expensive to manufacture. Additionally, choppers often generate a background that is not uniform or that greatly differs from the energy of the scene. A background that is not uniform may prevent adequate normalization of the thermal sensors. A background that differs from the scene may expose the thermal sensors to a large dynamic range that degrades quality of the image obtained from the scene.

SUMMARY OF THE INVENTION

Accordingly, a need has arisen in the art for an improved chopper. The present invention provides a diffuse chopper that substantially eliminates or reduces the disadvantages and problems associated with prior choppers.

In accordance with the present invention, a thermal imaging chopper may comprise a disk formed of a thermally transmitting material. The disk may include a structure operable to randomly scatter thermal radiation of a scene.

In one embodiment, the structure may comprise a phase relief pattern formed on the surface of the disk. The phase relief pattern may comprise a plurality of protuberances. In accordance with particular embodiments, the protuberances may comprise pyramidal shapes or square extensions of various heights. The phase relief pattern may also comprise grooves of varying depths and orientations. In accordance with another embodiment, the structure may comprise a plurality of fibers of the disk.

Important technical advantages of the present invention include providing a low cost chopper. In particular, a polymer disk is provided that is relatively inexpensive to manufacture.

Another technical advantage of the present invention includes providing an uniform background for normalization of the thermal sensors. In particular, the chopper randomly scatters thermal radiation of a scene incident to a detector. The scattered light provides a uniform background from which the thermal sensors may be normalized.

Still another technical advantage of the present invention includes providing a background related to the energy of the scene. In particular, the chopper allows energy of the scene to pass through to the thermal sensors during normalization. This reduces the dynamic range to which the thermal sensors are subjected and improves the quality of the visual image obtained from the thermal sensors.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
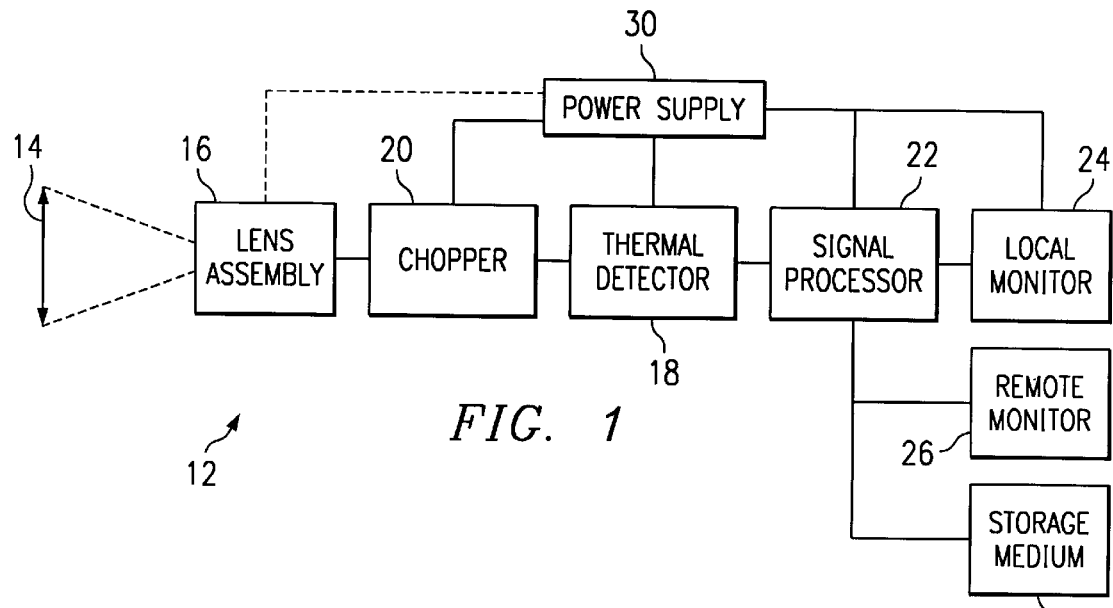
FIG. 1 is a block diagram showing the components of an exemplary thermal imaging system constructed in accordance with the present invention.

The preferred embodiments of the present invention and its advantages are best understood by referring now in more detail to FIGS. 1–5 of the drawings, in which like numerals refer to like parts throughout the several views. FIG. 1 shows a schematic block diagram of a thermal imaging system 12 constructed in accordance with the present invention. During operation, the thermal imaging system 12 detects, processes, and displays the heat image of a scene 14.

The thermal imaging system 12 may be especially useful when imaging by means of visual wavelengths is unavailable, such as in the dark or when vision is impaired by smoke, dust, or other particles. In such conditions, the thermal imaging system 12 may detect thermal radiation in the infrared window. The infrared window is a wavelength region in the infrared spectrum where there is good transmission of electromagnetic radiation through the atmosphere. Typically, infrared detectors sense infrared radiation in the spectral bands from 3 to 5 microns (having an energy of 0.4 to 0.25 eV) and from 8 to 14 microns (having an energy of 0.16 to 0.09 eV). The 3–5 micron spectral band is generally termed the "near infrared band" while the 8 to 14 micron spectral band is termed the "far infrared band." Infrared radiation between the near and far infrared bands cannot normally be detected due to atmospheric absorption of the same. The thermal imaging system 12, however, is also useful during the day and when vision by means of the visual wavelengths is available. For example, the thermal imaging system 12 may be used to detect fires, overheating machinery, planes, vehicles and people, and to control temperature sensitive industrial processes.

As shown in FIG. 1, the thermal imaging system 12 may comprise a lens assembly 16 in optical communication with a thermal detector 18. The lens assembly 16 focuses or directs thermal radiation emitted by the scene 14 onto the thermal detector 18. The lens assembly 16 may include one or more lenses made of material that transmits thermal radiation, such as germanium. The design of the lens assembly 16 may be varied depending on the particular use of the thermal imaging system 12. For example, the lens assembly 16 may have a constant or a variable F-number and/or may be a single field of view or a zoom lens.

The thermal detector 18 may be cooled or uncooled. A cooled thermal detector is operated at cryogenic temperatures such as at the temperature of liquid nitrogen, to obtain the desired sensitivity to variation in infrared radiation.

A significant feature of the invention is the construction of a chopper 20, which will be described in more detail below. The chopper 20 may be disposed between the lens assembly 16 and the thermal detector 18. Preferably, the lens assembly 16, thermal detector 18 and chopper 20 are contained within an associated housing (not shown). The thermal detector 18 may also be contained within a vacuum environment or an environment of low thermal conductivity gas.

The placement of the lens assembly 16 and the chopper 20 with respect to thermal detector 18 is accomplished using well known principles of optical design as applied to thermal imaging systems. As previously described, the lens assembly 16 focuses thermal radiation emitted by the scene 14 onto the thermal detector 18. The thermal detector 18 translates the incoming thermal radiation into corresponding electrical signals for processing.

The electrical signals of the thermal detector 18 may be passed to a signal processor 22, which assembles electrical signals into video signals for display. The signal processor 22 may also synchronize operation of the chopper 20. This synchronization enables the signal processor 22 to subtractively process incoming thermal radiation to eliminate fixed background radiation. The output of the signal processor 22 is often a video signal that may be viewed, further processed, stored, or the like.

The video signal of the signal processor 22 may be viewed on a local monitor 24 or fed to a remote monitor 26 for display. The local monitor 24 may be an eye piece containing an electronic viewfinder, a cathode ray tube, or the like. Similarly, the remote monitor 26 may comprise an electronic display, a cathode ray tube, such as a television, or other type of device capable of displaying the video signal. The video signal may also be saved to a storage medium 28 for later recall. The storage medium 28 may be a compact disk, a hard disk drive, random access memory, or any other type of medium capable of storing electronic video signals for later recall. Monitors and storage mediums are well known in the art and therefore will not be further described herein.

Electrical power to operate the thermal imaging system 12 may be provided by a power supply 30. The power supply 30 provides electrical power directly to the chopper 20, the thermal detector 18, the signal processor 22, and to the local monitor 24. Electrical power may also be provided to the lens assembly 16, when, for example, a motor is employed to zoom the lens assembly 16.

Figure 2:
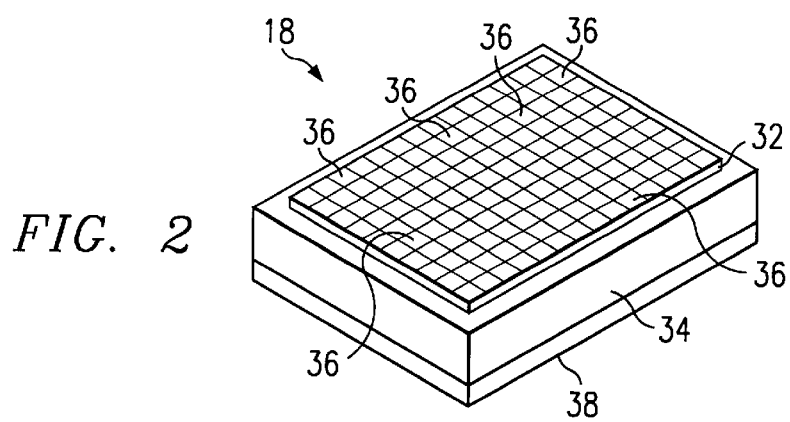
FIG. 2 is an isometric view of the thermal detector of FIG. 1, showing a focal plane array mounted to an integrated circuit substrate opposite a thermal element.

FIG. 2 is a detailed view of one embodiment of the thermal detector 18. The thermal detector 18 may comprise a focal plane array 32 mounted to a substrate 34. The configuration of the focal plane array 32 generally varies for different types of thermal detectors 18. In a "staring" thermal detector, for example, the entire thermal image is focused onto a large focal plane array. By contrast, a "scanning" thermal detector uses a mirror or similar means to sweep successive portions of the thermal image across a small focal plane array. Usually, although not necessary for the invention, both types of thermal detectors 18 consist of a number of thermal sensors 36, with the output of each thermal sensor 36 representing a portion of the viewed scene 14. For example, the output of each thermal sensor 36 in focal plane array 32 may represent a single pixel of the total image. This embodiment may be particularly beneficial for use in connection with high density visual displays.

The substrate 34 may be an integrated circuit substrate that provides the necessary electrical couplings and circuitry to control the chopper 20 and to process the thermal image formed on the focal plane array 32. The integrated circuit substrate 34 may be formed of silicon, ceramic alumina, or other suitable materials which are both chemically and thermally compatible with the multiple layers which will be formed on the surface 66 of the integrated surface substrate 34. Further information regarding thermal sensors mounted on an underlying integrated circuit substrate is disclosed by U.S. Pat. No. 4,143,269 issued to McCormack, et al., entitled "Ferroelectric Imaging System" and U.S. Pat. No. 5,021,663 issued to Hornbeck, entitled "Infrared Detector."

For an embodiment in which the thermal detector is uncooled, a thermal element 38 may be provided to maintain the integrated circuit substrate 34 at a constant predefined temperature. The constant temperature prevents ambient or internally generated temperature gradients from affecting the thermal sensors 36 and thus provides a baseline with which the thermal energy of the scene 14 can be accurately measured. The necessary electrical couplings and circuitry to control the thermal element 38 may be provided by the integrated circuit substrate 34. In such a case, the thermal element 38 may be coupled to the integrated circuit substrate 34 opposite the focal plane array 32.

The focal plane array 32 may includes a matrix of thermal sensors 36. In one embodiment, the quantity and location of the thermal sensors 36 may depend upon the N by M configuration desired for the focal plane array 32. Each thermal sensor 36 may form a discrete element of the focal plane array 32. The thermal sensors 36 may detect thermal radiation using various techniques. For example, the thermal sensors 36 may be based upon the generation of a charge due to a change in temperature resulting from thermal radiation heating the thermal sensors 36. Alternatively, the thermal sensors 36 may be based upon the generation of a charge due to a photon-electron interaction within the material used to form the thermal sensors 36. This latter effect is sometimes called the internal photoelectric effect. The thermal sensors 36 may also be based upon the change in resistance of a thin conductor caused by the heating effect of thermal radiation. Such thermal sensors 36 are sometimes referred to as bolometers. It will be understood that these and other types of thermal sensors may be used in accordance with the present invention.

Figure 3:
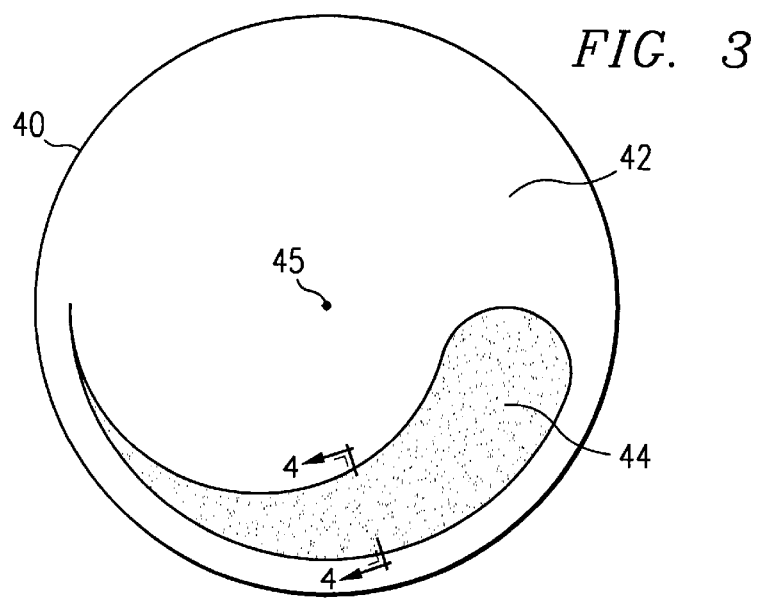
FIG. 3 is a plan view of one embodiment of the chopper of FIG. 1, showing a phase relief pattern for scattering thermal radiation in accordance with the present invention.

As previously described, a significant feature of the present invention is the construction of the chopper 20. As shown by FIG. 3, the chopper 20 may comprise a disk 40. A window 42 and a structure 44 may be coupled to the disk 40. As explained in more detail below, the window 42 may transmit a high degree of thermal radiation of the scene 14. Conversely, the structure 44 may blur the thermal radiation of the scene 14.

The chopper 20 may be rotatably mounted at a center 45 of the disk 40. As the chopper 20 is rotated, the window 42 and the structure 44 are periodically disposed between the scene 14 and the focal plane array 32. Accordingly, the chopper 20 will periodically interrupt and transmit thermal radiation of the scene 14 to the focal plane array 32. Interruption of the thermal radiation normalizes the thermal sensors 36 of the focal plane array 32. Accordingly, the thermal sensors 36 are normalized during each revolution of the chopper 20.

The disk 40 may have substantially planer opposing sides and be substantially round in shape. It will be understood that the disk 40 may be other shapes and configurations capable of interrupting transmission of the thermal image.

The disk 40 may be formed of an infrared transmitting polymer. The polymer may be polyethylene, polypropylene and the like. In one embodiment, the polymer may be polyethylene. A benefit of a polymer chopper is that it is relatively inexpensive to manufacture. It will be understood, however, that the other thermally transmitting materials may be used in accordance with the present invention.

The polymer of the disk 40 may be relatively thin. The thin layer of polymer transmits a high degree of the thermal radiation. A high degree of transmission may be about eighty (80) percent or more of the thermal radiation received. To achieve a high degree of transmission, the thickness of the disk 40 may be between 25 and 75 microns. This thickness may pass eighty-five (85) percent or more of the thermal radiation received. It will be understood that the thickness of the disk 40 may be varied below 25 microns as long as the mechanical integrity of the disk 40 is maintained. Additionally, the thickness of the disk 40 may be varied above 75 microns as long as the disk 40 retains a high degree of transmission.

Figure 5:
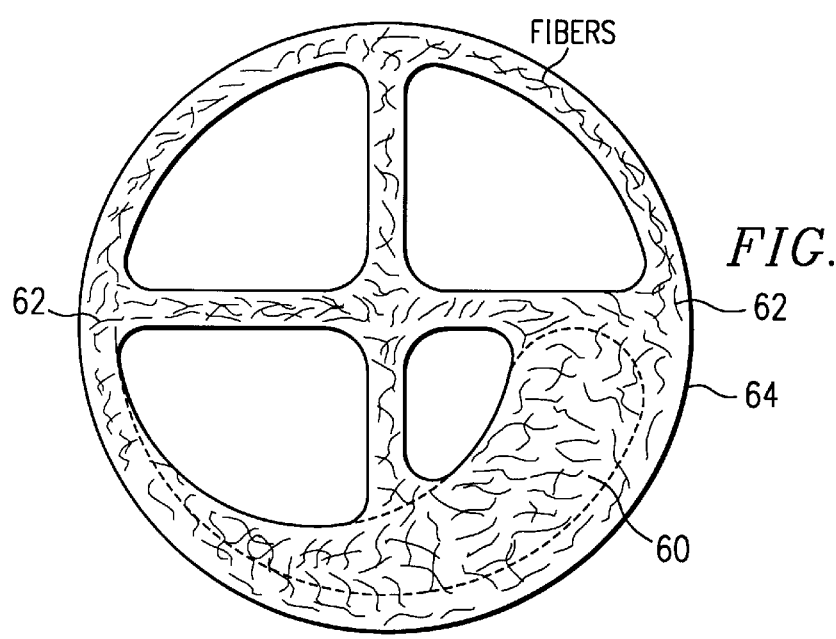
FIG. 5 is a plan view of another embodiment of the chopper of FIG. 1, showing a structure of fibers for randomly scattering thermal radiation in accordance with the present invention.

As previously described, the window 42 may transmit a high degree of thermal radiation of the scene 14. The window 42 may be integral with the disk 40 (FIG. 3) or may be an opening cut-out of the disk 40 (FIG. 5). Where the window 42 is integral with the disk 40, the window 42 may be the non structured area of the disk 40. In this embodiment, the material of the disk 40 should have a high degree of thermal transmission. Thus, when the window 32 is disposed between the scene 14 and the focal plane array 32, a majority of the thermal radiation will pass through the window 42 and be received at the focal plane array 32.

Where the window 42 is an opening cut-out of the disk 40, thermal radiation may pass through the window 42 and be received at the focal plane array 32 without any loss in intensity. In this embodiment, the material of the disk 40 may have a low degree of thermal transmission. However, even where the material of the disk 40 has a high degree of thermal transmission, an opening may be used to prevent even a small loss in intensity of the thermal radiation.

As previously described, the structure 44 may blur thermal radiation of the scene 14. As used herein, the term "blur" means to diffract, diffuse, unfocus or otherwise distort thermal radiation of the scene 14 at the focal plane array 32. As described in U.S. patent application Ser. No. 08/159,879 entitled "Infrared Chopper Using Binary Diffractive Optics," the structure 44 may comprises a series of small lenses, or lenslets, that focus the thermal energy away from the focal plane array 32.

The structure 44 may be in a shape of a spiral. In this shape, the structure 44 may interrupt transmission of the thermal image to the thermal sensors 36 sequentially. Accordingly, the thermal sensors 36 may be normalized sequentially. This allows the electrical signal of the thermal sensors 36 to be read and processed sequentially. If desired, the disk 40 may include two or more structures 44. Each structure 44 will normalize the thermal sensors 36 once each revolution of the chopper 20.

Figure 4A:
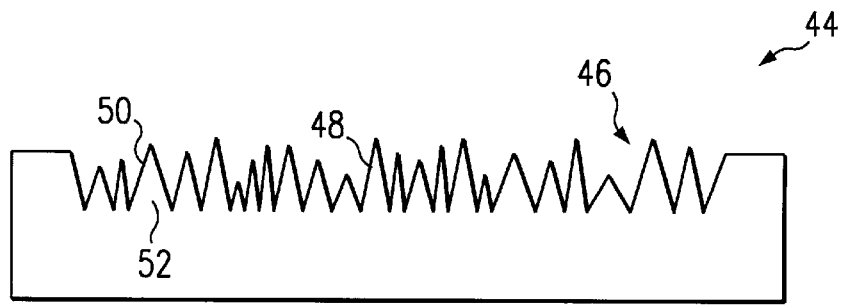
FIGS. 4A–C are a series of detailed elevation views in section showing various protuberances of the phase relief pattern of FIG. 3.
Figure 4B:
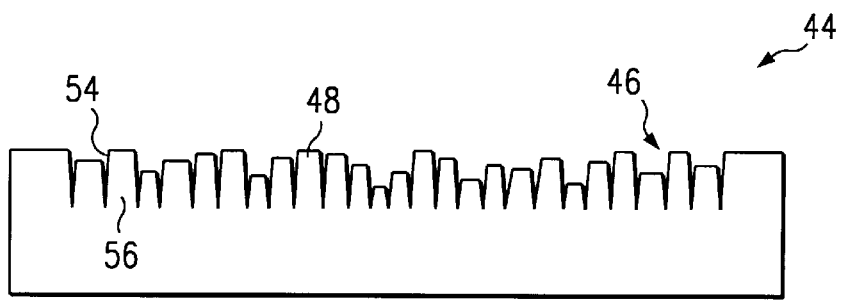
Figure 4C:
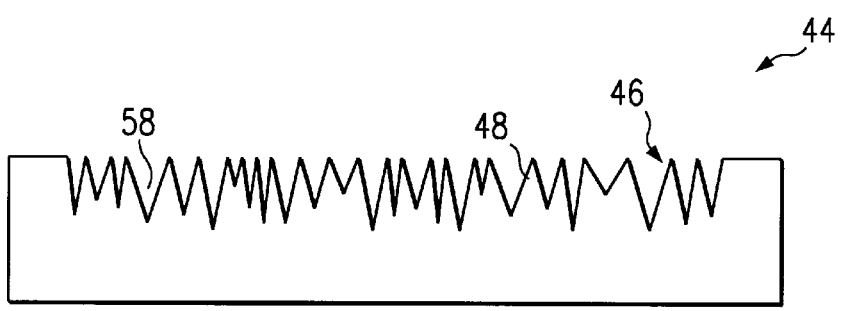

In accordance with the present invention, the structure 44 may randomly scatter thermal radiation of the scene 14. In one embodiment, the structure 44 may comprise phase relief pattern formed 46 in the surface of the disk 40. In this embodiment, the phase relief pattern 46 may comprise a plurality of protuberances 48 (FIGS. 4A–4C). The protuberances 48 may be elongated with a small base. This type of geometric shape typically scatters thermal radiation over a large area.

The protuberances 48 may vary in height depending on the wavelengths of thermal radiation of the detector 18. The heights of the protuberances 48 should be selected to maximize their scattering effect. The height of the protuberances 48 preferably range from about 3 to 5 times the length of a lower wavelength of the thermal detector 18 to about 3 to 5 times the length of an upper wavelength of the thermal detector 18. It will be understood that the height of the protuberances 48 may be below 3 times the lower wavelength or above 5 times the upper wavelength. However, because the scattering effect of the protuberances 48 may decrease outside this range, it is preferred that the height of the protuberances 48 be in the range of 3 to 5 times the wavelength.

It should also be understood that the height of the protuberances 48 may be calculated in other ways. For example, vector diffraction theory and other similar means may be used to determine heights of the protuberances 48. Additionally, the height of their protuberances 48 may be based on anti-reflection sub-wavelength structured surface features. In this case, the height of the protuberances 48 may be about 4 to 5 times the height of a sub-wavelength structured surface feature for a given wavelength.

The base of the protuberances 48 may be on the order of the wavelengths of the thermal detector 18. Additionally, the duty cycle of the protuberances 48 may be approximate to the size of the base. Thus, in one embodiment, the protuberances 48 may have a small base, be elongated and tightly packed together.

FIGS. 4A–C depict various embodiments of the protuberances 48. As shown by FIG. 4A, the protuberances 48 may be pyramidal shapes 50. In this embodiment, the pyramids 50 are elongated and tightly packed together with little or no space between their bases 52. The pyramids 50 randomly scatter thermal radiation of the scene 14 incident to the focal plane array 32.

As shown by FIG. 4B, the protuberances 48 may be square extensions 54. The square extensions 54 by have a square, rectangular or other similar type of cross section. In this embodiment, the square extensions 54 are elongated and tightly packed together with little or no space between their bases 56. The square extensions 54 randomly scatter thermal radiation of the scene 14 incident to the focal plane array 32.

The protuberances may be formed on the surface of the disk 40 with an embossing tool (not shown). The embossing tool may be a flat block of aluminum or other suitable material. The embossing tool may have a surface shaped to create the desired protuberances. As previously described, the protuberances may have a pyramidal, square or other geometric shape, and may be elongated with a relatively small base. The surface of the embossing tool may be shaped by diamond point turning (DPT), photolithography, holographic plates and the like. Typically, the embossing tool will be heated above the melting temperature of the material of the disk 40 and then pressed into the disk 40 to form the phase relief pattern formed 46.

As shown by FIG. 4C, the phase relief pattern may also comprise a plurality of grooves 58 of varying depths and orientations. The depths of the grooves 58 may be determined in the same manner as previously described for the height of the protuberances 48. The grooves 58 may be formed by rubbing an abrasive surface against the surface of the disk 40. Preferably, the abrasive surface includes varying grit that matches the desired depths of the grooves 58. Thus, for example, the grooves 58 may be formed by scratching the surface of the disk 40 with sand paper.

As shown by FIG. 5, a structure 60 may comprise a plurality of fibers 62 of a disk 64. In this embodiment, the thermal radiation of the scene 14 may be bulk scattered by the disk 64. As described in more detail below, the fibers 62 cooperate with voids (not shown) is the disk 64 to randomly scatter thermal radiation of the scene 14 incident to the focal plane array 32.

In this embodiment, the material of the disk 64, fibers 62 and voids, may have a low degree of thermal transmission. Accordingly, a window 66 comprising an opening cut-out of the disk 64 may be provided. The opening allows thermal radiation to pass through the window 66 and be received at the focal plane array 32 without a loss in intensity.

The disk 64 may be formed by consolidating a plurality of fibers 62 into the disk 64, but leaving voids, gaps or other types of spaces between the fibers 62. Preferably, the fibers 62 have a diameter about 2 to 5 time the wavelength of thermal detector 18. The fibers 62 may be a polymer such as polyethylene, polypropylene or the like. The fibers 62 may be partially consolidated using thermoplastic or thermal setting techniques. Fibers 62 may also be consolidated by heat pressing them into a single sheet. The voids left between the fibers 62 are preferably 3 to 5 times the size of the wavelength of the thermal detector 18.

In addition to the fibers 62, polymer powders and/or scraps may be used to form the disk 64. Moreover, disparate types of fibers having different indexes of refraction may be used and completely consolidated. In this case, the difference between the indexes of refraction causes a scattering of the thermal radiation. It will be understood that other types of materials may be used to form the bulk scatter disk 64. Typically, the greater the difference between the indexes of refraction of two materials used to form the disk 64, the greater the bulk scatter effect.

Although the present invention has been described with several embodiments, various changes and modifications may be suggested to one skilled in the art. It is intended that the present invention encompass such changes and modifications as fall within the scope of the appended claims.

What is claimed is:

1. A thermal imaging chopper, comprising:
   a disk formed of thermally transmitting material;
   the disk including a structure operable to randomly scatter thermal radiation of a scene.

2. The chopper of claim 1, wherein the structure comprises a phase relief pattern formed on a surface of the disk.

3. The chopper of claim 2, wherein the phase relief pattern comprises a plurality of protuberances of varying heights.

4. The chopper of claim 3, wherein the plurality of protuberances comprise pyramidal shapes of varying heights.

5. The chopper of claim 3, wherein the plurality of protuberances comprise square extensions of varying heights.

6. The chopper of claim 2, wherein the phase relief pattern comprises a plurality of grooves of varying depths and orientations.

7. The chopper of claim 2, wherein the phase relief pattern comprises a plurality of protuberances of varying heights, the heights ranging from about three (3) to five (5) times a length of a lower wavelength of the chopper to about three (3) to (5) times a length of the upper wavelength of the chopper.

8. The chopper of claim 2, wherein the phase relief pattern comprises a plurality of protuberances of varying heights, the heights ranging from about three to five times a length of a lower wavelength of a detector for the thermal radiation to about three to five times a length of the upper wavelength of the detector.

9. The chopper of claim 8, wherein the protuberances have bases which have dimensions approximately equal to a wavelength of the detector.

10. The chopper of claim 1, wherein the structure comprises a plurality of fibers of the disk.

11. The chopper of claim 10, wherein the fibers have diameters in the range from about two times to about five times a wavelength of a detector for the thermal radiation.

12. The chopper of claim 11, including voids between the fibers, the voids having sizes in the range from about 3 times to about 5 times a wavelength of the detector.

13. The chopper of claim 1, wherein the disk is formed of a high infrared transmitting material.

14. The chopper of claim 1, wherein the disk is formed of a low infrared transmitting material, the disk further comprising a high infrared transmitting window.

15. The chopper of claim 1, wherein the disk is formed of a polymer.

16. The chopper of claim 15, wherein the polymer disk has a thickness in the range from about 25 microns to 75 microns.

17. The chopper of claim 15, wherein the polymer passes at least 80% of the thermal radiation.

18. The chopper of claim 1, wherein the disk is formed of polyethylene.

19. The chopper of claim 1, wherein the structure has approximately the shape of a spiral.

20. A thermal imaging system for producing an image of a scene in response to incident thermal radiation from the scene, comprising:
   optics for focusing incident thermal radiation emitted by the scene onto a focal plane array;
   a chopper disposed between the optics and the focal plane array, the chopper comprising:
     a disk formed of thermally transmitting material;
     the disk including a structure operable to randomly scatter thermal radiation of the scene incident to the focal plane array;
   the focal plane array including a plurality of thermal sensors mounted to a substrate, the thermal sensors operable to detect incident thermal radiation;
   the thermal sensors cooperating with the chopper to produce a signal;
   electronics for receiving and processing the signal to obtain a video signal representing radiance differences emitted by objects in the scene; and
   a display for receiving the video signal and for displaying an image generated in response to the video signal.

21. The system of claim 20, wherein the structure comprises a phase relief pattern formed on a surface of the disk, the phase relief pattern comprises a plurality of protuberances of varying heights.

22. The system of claim 21, wherein the plurality of protuberances comprise pyramidal shapes of varying heights.

23. The system of claim 21 wherein the plurality of protuberances comprise square extensions of varying heights.

24. The system of claim 20, wherein the structure comprises a phase relief pattern of a plurality of grooves of varying depths and orientations.

25. A method of normalizing a thermal sensor, comprising the steps of:
   periodically disposing a phase relief pattern in a beam of thermal radiation incident to the thermal sensor; and
   randomly scattering the beam of thermal radiation.

26. The method of claim 25, wherein the phase relief pattern comprises a plurality of protuberances of varying heights.

27. The method of claim 25, wherein the phase relief pattern comprises a plurality of pyramidal shapes of varying heights.

* * * * *